United States Patent Office 3,378,588
Patented Apr. 16, 1968

3,378,588
PREPARATION OF TERTIARY AMINES FROM ALKYL SULFATES
Sydney H. Shapiro, Chicago, Ill., assignor, by mesne assignments, to Armour Industrial Chemical Company, a corporation of Delaware
No Drawing. Filed Sept. 1, 1964, Ser. No. 393,750
2 Claims. (Cl. 260—583)

ABSTRACT OF THE DISCLOSURE

An alkyl sulfate, in which the hydrocarbon radical has from 6–22 carbon atoms, is reacted directly and under pressure with a secondary amine in the presence of a strong base and at a temperature of about 100°–200° C. to prepare tertiary amines.

---

This invention relates to the preparation of tertiary amines from alkyl sulfates.

An object of the invention is to provide a unique process in which tertiary amines can be produced through the reaction of alkyl sulfates with secondary amines. Yet another object is to provide a process in which the preparation of tertiary amines can be obtained in large yield and in a closed system at autogenetic pressures. Other specific objects and advantages will appear as the specification proceeds.

In one embodiment of the invention, an alkyl sulfate is reacted with a secondary amine in the presence of a strong base and at a reaction temperature of about 100° to 200° C., and preferably in the range of about 130° to 160° C.

The alkyl sulfates may be derived from olefins which are sulfonated and then neutralized, examples being the sodium and potassium alkyl sulfates. I prefer to treat higher or long chain alkyl sulfates having in the hydrocarbon radical from 6 to 22 carbon atoms. Best results have been obtained employing as the base sodium hydroxide or potassium hydroxide. The reaction is carried out in a closed system of autogenetic pressures, the preferred pressures being between 200 and 500 pounds per square inch. The reaction is completed with a high yield of over 95 percent tertiary amine content in periods of from less than 4 hours up to 8 hours.

The preparation of the tertiary amine may be illustrated by the following equation:

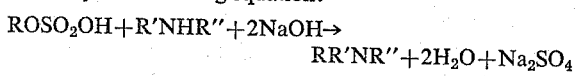

R, R″, R′ can be any alkyl radical.

Specific examples illustrative of the process may be set out as follows:

Example I

A one-liter autoclave was charged with 144 grams (0.5 mole) sodium lauryl sulfate and 20 grams (0.5 mole) of NaOH. A solution of 40 grams of dimethylamine gas in 200 grams of water was made up and added to the autoclave. The vent was quickly closed, the reaction mixture was stirred and heated at 140° to 160° C. (pressure 240 to 340 lbs.) for four hours. The reaction mixture was cooled to 100° C. The contents of the autoclave were poured into a separatory funnel and the oil layer separated off, yielding 102 grams of a dark amber crude oil product (95.5% of theory). The product was distilled, yielding an 85% distillate with a 95% tertiary amine content.

In the above example, the feed material is lauryl sulfate. The product was analyzed for chain length by gas chromatographic analysis after conversion to the end products and gave the following analysis:

| Carbon chain length: | Percent |
|---|---|
| 8 | 9.3 |
| 10 | 3.2 |
| 12 | 45.2 |
| 14 | 29.9 |
| 16 | 12.1 |

Example II

The process is carried out as described in Example I except that potassium hydroxide is employed as the base instead of sodium hydroxide with comparable results.

Example III

Potassium lauryl sulfate is treated in the manner described in Example I and approximately 95 percent tertiary amine content is obtained.

While in the foregoing specification, I have set forth a specific process in considerable detail for the purpose of illustrating embodiments of my invention, it will be understood that such details may be varied widely by those skilled in the art without departing from the spirit of my invention.

I claim:
1. In a process for the preparation of a tertiary amine, the step of heating in a closed system under pressure an alkyl sulfate, in which the alkyl radical has from 6–22 carbon atoms with a secondary di-lower-alkylamine in the presence of a strong base and at a reaction temperature in the range of about 100–200° C.

2. The process of claim 1 in which the hydrocarbon radical has from 10–22 carbon atoms.

References Cited

UNITED STATES PATENTS 2,364,178  12/1944  Wilson ............ 260—585 X
2,618,659  11/1952  Wright et al. ...... 260—585 X CHARLES B. PARKER, *Primary Examiner.*
R. L. RAYMOND, *Assistant Examiner.*